(12) United States Patent
Bhoopali et al.

(10) Patent No.: US 11,301,168 B2
(45) Date of Patent: Apr. 12, 2022

(54) STORAGE SYSTEM AND METHOD FOR USER-DEFINED DATA ARCHIVING

(71) Applicant: Western Digital Technologies, Inc., San Jose, CA (US)

(72) Inventors: Laxmi Bhoopali, Bangalore (IN); Ramanathan Muthiah, Bangalore (IN); Kshitij Gupta, Uttarpradesh (IN); Niraj Srimal, Marathalli (IN)

(73) Assignee: Western Digital Technologies, Inc., San Jose, CA (US)

( * ) Notice: Subject to any disclaimer, the term of this patent is extended or adjusted under 35 U.S.C. 154(b) by 3 days.

(21) Appl. No.: 16/713,620

(22) Filed: Dec. 13, 2019

(65) Prior Publication Data

US 2021/0181975 A1    Jun. 17, 2021

(51) Int. Cl.
  *G06F 3/06* (2006.01)
  *G06F 11/14* (2006.01)
  *G06F 12/02* (2006.01)
  *G06F 11/07* (2006.01)

(52) U.S. Cl.
  CPC .......... *G06F 3/0659* (2013.01); *G06F 3/067* (2013.01); *G06F 3/0608* (2013.01); *G06F 3/0611* (2013.01); *G06F 3/0614* (2013.01); *G06F 3/0646* (2013.01); *G06F 11/076* (2013.01); *G06F 11/1451* (2013.01); *G06F 11/1464* (2013.01); *G06F 12/0246* (2013.01); *G06F 12/0253* (2013.01); *G06F 12/0292* (2013.01)

(58) Field of Classification Search
  CPC .... G06F 3/0659; G06F 12/0246; G06F 3/067; G06F 3/0611; G06F 3/0614; G06F 12/0292; G06F 3/0608; G06F 3/0646; G06F 12/0253; G06F 11/076; G06F 11/1451; G06F 11/1464
  USPC .......................................... 711/154
  See application file for complete search history.

(56) References Cited

U.S. PATENT DOCUMENTS

| | | | |
|---|---|---|---|
| 6,903,972 B2 | 6/2005 | Lasser et al. | |
| 7,523,140 B2 | 4/2009 | Mosek | |
| 10,437,721 B2 * | 10/2019 | Leshinsky | G06F 12/0253 |
| 2010/0265768 A1 * | 10/2010 | Kasuga | G11C 11/5628 365/185.03 |
| 2015/0012494 A1 * | 1/2015 | Jewell | G06F 11/1464 707/638 |
| 2019/0197364 A1 * | 6/2019 | Cheng | G06F 16/51 |

OTHER PUBLICATIONS

"VeraCrypt—Free Open source disk encryption with strong security for the Paranoid"; downloaded from the Internet on Sep. 27, 2019 at https://www.veracrypt.fr/en/Home.html; 4pages.

* cited by examiner

*Primary Examiner* — Hua J Song
(74) *Attorney, Agent, or Firm* — Crowell & Moring LLP

(57) ABSTRACT

A storage system and method for user-defined data archiving are provided. In one embodiment, the method comprises: receiving a write command from a host; determining whether the storage system received an indicator from the host indicating that data of the write command is archive data; in response to determining that the storage system received the indicator, storing the data in the multi-level memory cells; and in response to determining that the storage system did not receive the indicator, storing the data in the single-level memory cells. Other embodiments are provided.

20 Claims, 9 Drawing Sheets

STORAGE SYSTEM AND METHOD FOR USER-DEFINED DATA ARCHIVING

BACKGROUND

Storage systems, such as universal serial bus (USB) devices and external solid state drives (SSDs), are commonly used to store data either for long-term data archiving or for temporary storage when moving data from one host to another (which is especially the case with dual-port-type USB devices). The storage system can store data more efficiently if it knows whether the data is being stored for data archiving or for temporary storage. Some storage systems use host or storage system learning algorithms to attempt to determine the intent of the data movement, with varying degrees of accuracy.

DETAILED DESCRIPTION

Overview

Figure 1A:
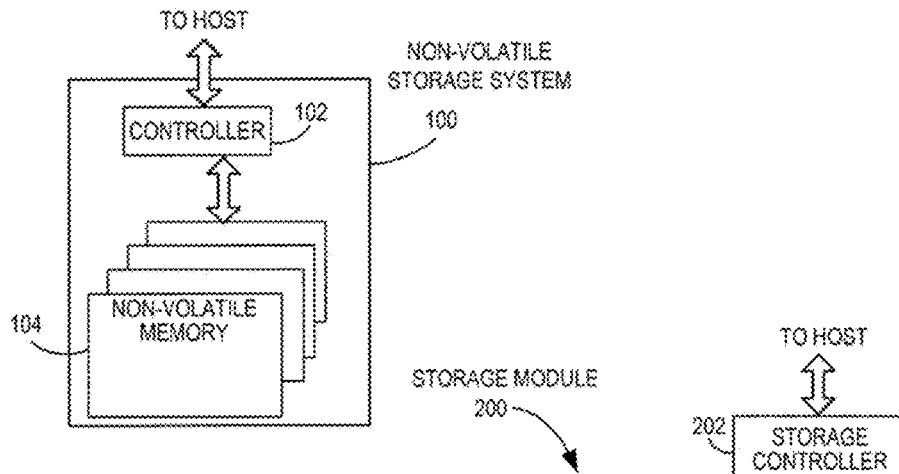
FIG. 1A is a block diagram of a non-volatile storage system of an embodiment.

By way of introduction, the below embodiments relate to a storage system and method for user-defined data archiving. In one embodiment, a method for user-defined data archiving is provided that is performed in a storage system comprising a memory with single-level memory cells and multi-level memory cells. The method comprises: receiving a write command from a host; determining whether the storage system received an indicator from the host indicating that data of the write command is archive data; in response to determining that the storage system received the indicator, storing the data in the multi-level memory cells; and in response to determining that the storage system did not receive the indicator, storing the data in the single-level memory cells.

In some embodiments, the method further comprises storing the indicator in the memory.

In some embodiments, the method further comprises using the stored indicator to determine whether the data should be backed up to memory in a network cloud.

In some embodiments, the method further comprises using the stored indicator to determine where to move the data in a garbage collection operation.

In some embodiments, the method further comprises in response to determining that the storage system received the indicator, storing the data in a block of memory cells that has a first program error count (PEC) without first storing it in another block of memory cells that has a program error count (PEC) lower than the first program error count (PEC).

In some embodiments, the method further comprises providing the host with computer-readable program code configured to allow a user to place the data in the archive folder.

In another embodiment, a storage system is provided comprising a memory and a controller. The controller is configured to: receive a write command from a host; determine whether an archive attribute is present in the write command, wherein the archive attribute indicates that data of the write command was placed by a user into an archive folder in the host; and route the data to different locations in the memory depending on whether or not the archive attribute is present in the write command.

In some embodiments, the controller is further configured to route the data to multi-level memory cells in the memory in response to the archive attribute being present in the write command.

In some embodiments, the controller is further configured to store the archive attribute in the memory.

In some embodiments, the controller is further configured to use the stored archive attribute in a garbage collection operation.

In some embodiments, the controller is further configured to store the data in a block of memory cells that has a first program error count (PEC) without first storing it in another block of memory cells that has a program error count (PEC) lower than the first program error count (PEC).

In some embodiments, the controller is further configured to provide the host with computer-readable program code configured to allow a user to place the data in the archive folder.

In some embodiments, the memory comprises a three-dimensional memory.

In some embodiments, the storage system is configured to be integrated in the host.

In some embodiments, the storage system is configured to be removably connected with the host.

In another embodiment, a storage system is provided comprising a memory; means for determining whether the storage system received information from a host that indicates that data is archive data; and means for, in response to determining that the storage system received the information, storing the data in cold storage in the memory.

In some embodiments, cold storage in the memory comprises multi-level memory cells.

In some embodiments, the storage system further comprises means for using the information to determine whether the data should be backed up to memory in a network cloud.

In some embodiments, the storage system further comprises means for using the information to determine where to move the data in a garbage collection operation.

In some embodiments, the storage system further comprises means for providing the host with computer-readable program code configured to allow a user to place the data in the archive folder.

Other embodiments are possible, and each of the embodiments can be used alone or together in combination. Accordingly, various embodiments will now be described with reference to the attached drawings.

EMBODIMENTS

Figure 1B:
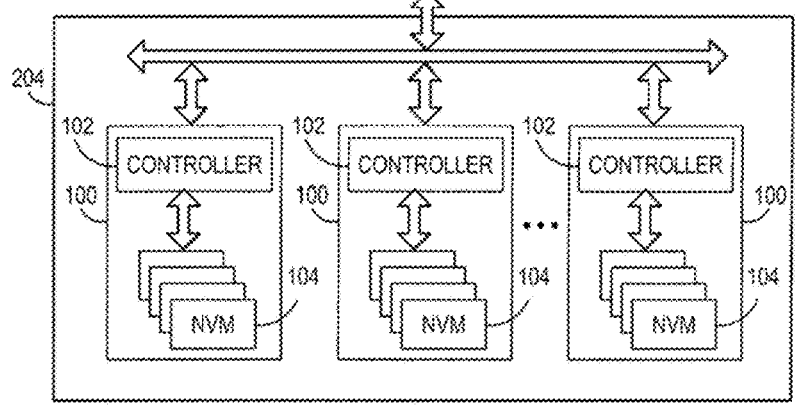
FIG. 1B is a block diagram illustrating a storage module of an embodiment.
Figure 1C:
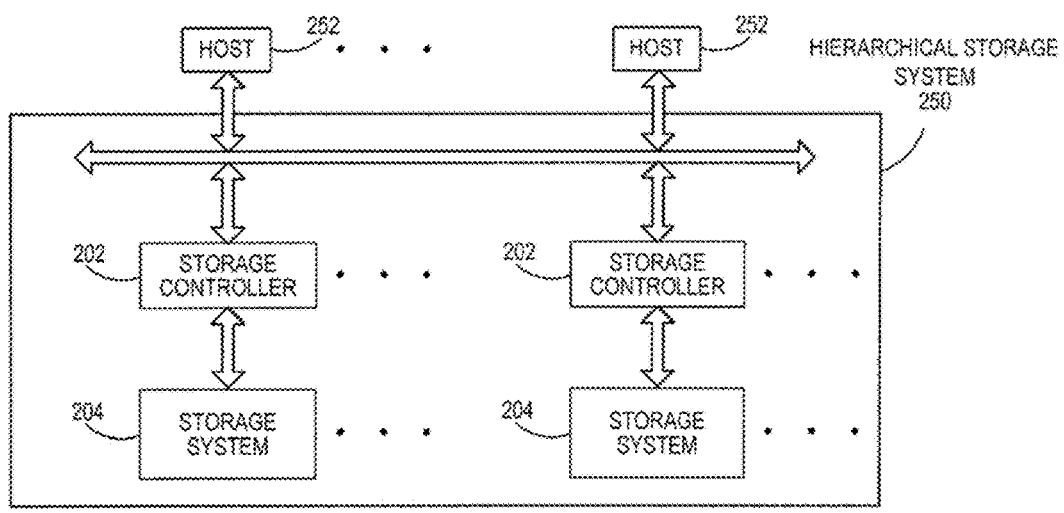
FIG. 1C is a block diagram illustrating a hierarchical storage system of an embodiment.

Storage systems suitable for use in implementing aspects of these embodiments are shown in FIGS. 1A-1C. Figure A is a block diagram illustrating anon-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
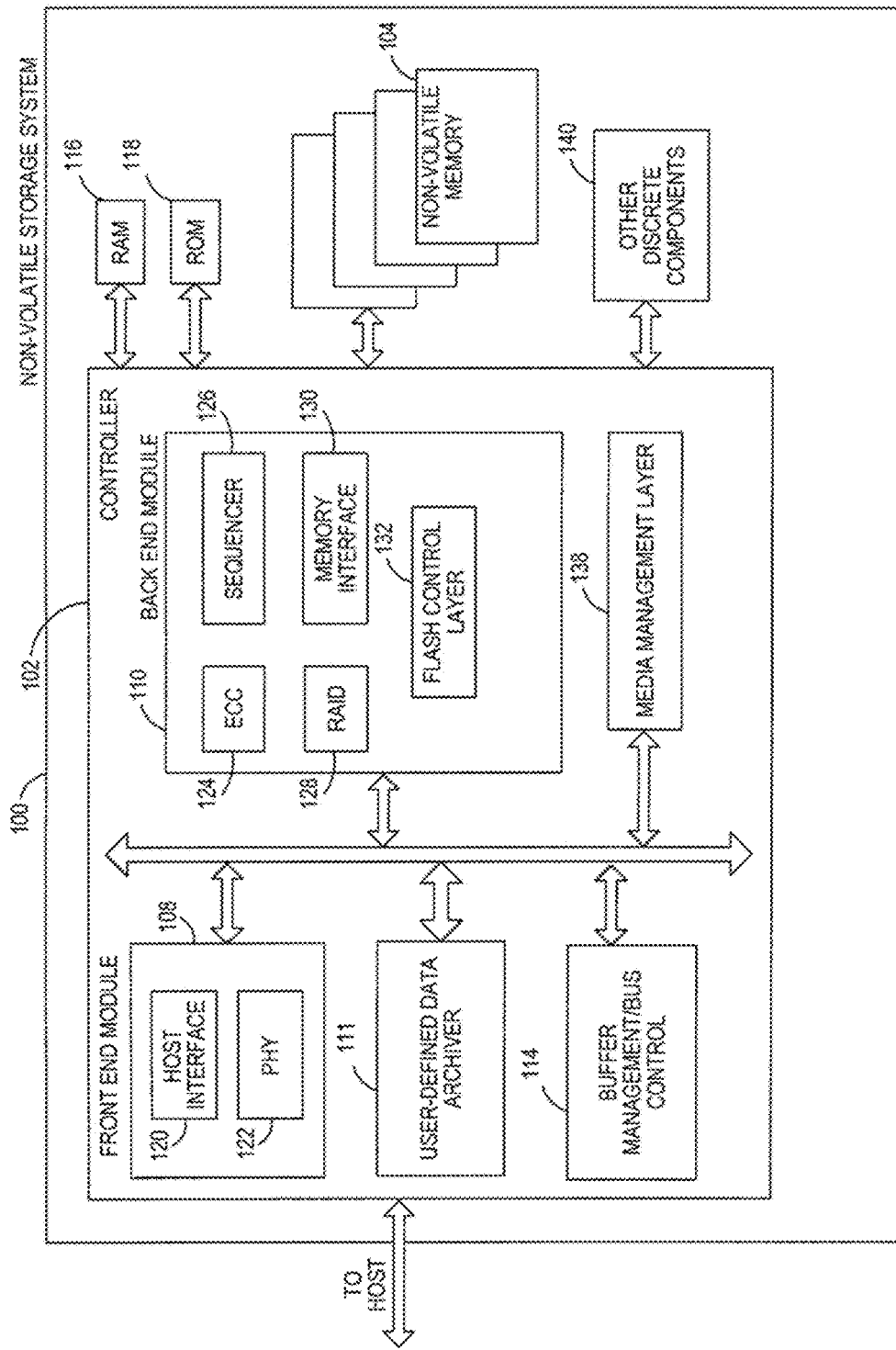
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a user-defined data archiver 111, which is discussed in more detail below, and can be implemented in hardware or software/firmware. The user-defined data archiver 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the BCC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
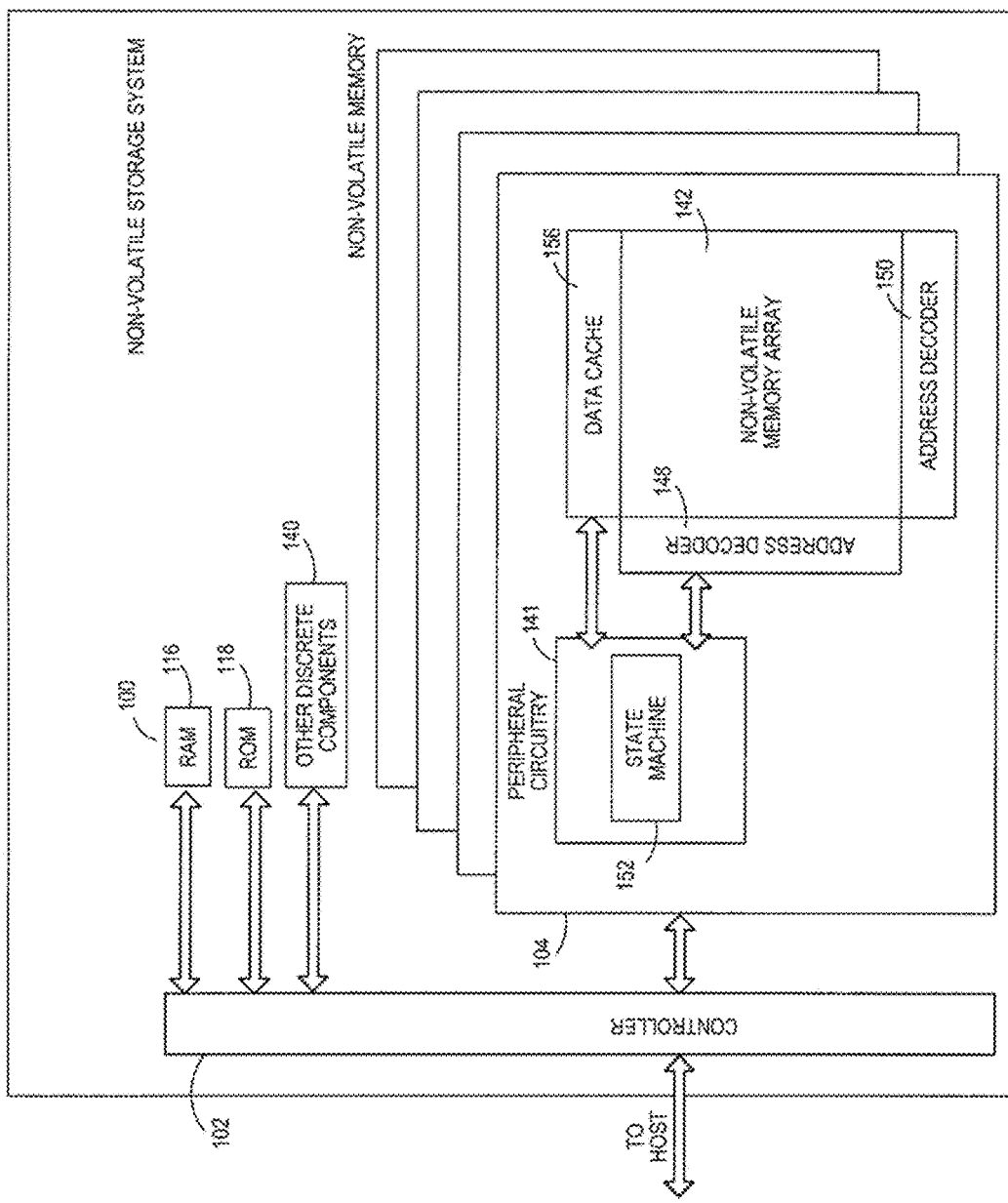
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

As mentioned above, storage systems, such as universal serial bus (USB) devices and external solid state drives (SSDs), are commonly used to store data either for long-term data archiving or for temporary storage when moving data from one host to another (which is especially the case with dual-port-type USB devices). The storage system can store data more efficiently if it knows whether the data is being stored for data archiving or for temporary storage. For example, the memory in the storage system can comprise multi-level cells (MLC) and single-level cells (SLC). Data is written and read faster from SLC cells, but MLC cells provide a higher storage density. In a typical write operation, data is first written to SLC cells to provide fast (burst) performance and then moved to MLC based on internal storage system logic. If the storage system knows that the data is intended for long-term ("cold") storage, the storage system can bypass first storing the data in the SLC cells and directly write the data to the MLC cells. Through this approach, write amplification can be avoided, and temporary data can always be stored in the SLC cells, which provides better performance in data movement from one host to another. That is, generally speaking, incoming data is considered hot and written to a memory block with a low program error count (PEC). If the storage system 100 knows that the data is meant to be archived, it can directly write the data into a block with high PEC count (as opposed to first storing it in a block with a low PEC count). This would reduce the write amplification.

Some storage systems use host or storage system learning algorithms to attempt to determine the intent of the data movement, with varying degrees of accuracy. Some algorithms are based on file properties, but two files with the same properties may be stored for different purposes (archiving versus temporary storage). For example, when a user writes photos, it could be for archiving, or it could be just for temporary host-to-host movement. Other algorithms route data to different types of memory cells based on whether the host or the storage system thinks the data is random data or sequential data (e.g., data stored in non-sequential or sequential addresses in memory). However, the random/sequential determination requires an amount of speculation that can result in an incorrect conclusion.

The following embodiments can be used to take the guess work out of this analysis by accommodating a user-defined preference for the data to optimize storage. With these embodiments, the user explicitly specifies whether data is intended for archiving or for temporary storage, and the storage system 100 stores the data accordingly. Having the user explicitly specify whether data is meant for archiving or for temporary storage is more accurate than self judgement of the host or storage system 100.

Further, in one embodiment, this preference is stored with the data (e.g., as metadata), so that preference can be used later (the guessed preference in the prior approaches is not stored). For example, some storage systems are configured to guarantee storage of data by backing it up in the cloud. With these embodiments, the stored preference can be used to give priority to the data designated as archive data when the storage space available in the cloud is less than the size of the memory 104 in the storage system 100, thereby providing the user with the option of what data to back-up to the cloud. The stored preference can also be used during dynamic data relocation to route archive (cold) data to a memory block with a high program error count (PEC), which can improve endurance of the MLC cells.

Figure 3:
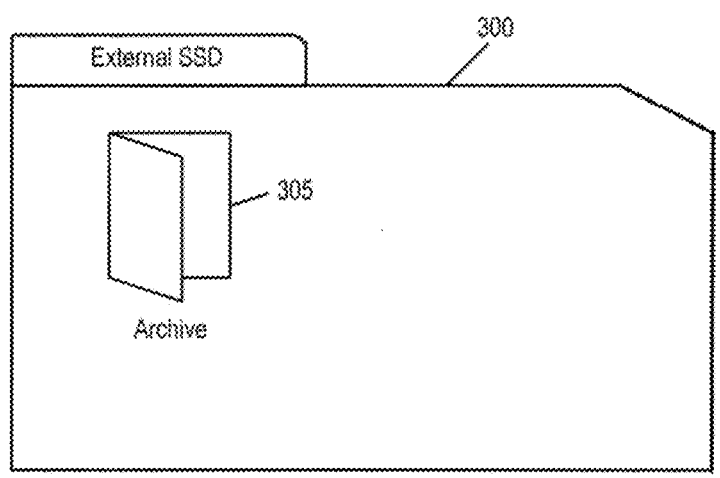
FIG. 3 is an illustration of a fixed data archive folder in a root folder of a file system used with a storage system of an embodiment.
Figure 4:
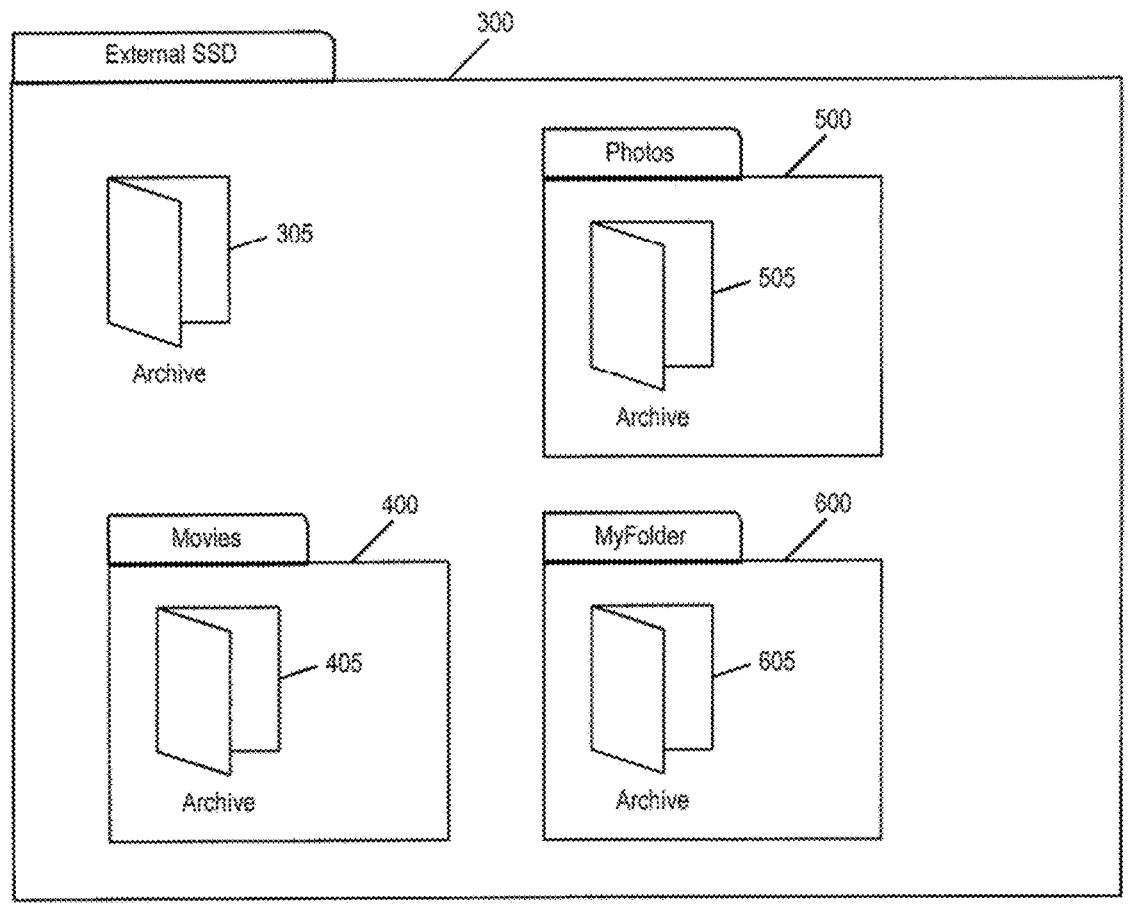
FIG. 4 is an illustration of fixed data archive folders in a root folder and in user-created subfolders of a file system used with a storage system of an embodiment.

The user indication of the nature of the data can be provided in any suitable way. In one embodiment, the host creates, in the file system, a default sub-folder that is for archiving. (The terms sub-folder, folder, section, and directory will be used interchangeably herein.) For example, as shown in FIG. 3, the host can create a fixed archive sub-folder 305 in the root folder 300 of the storage system 100 (e.g., an external SSD). Additionally, as shown in FIG. 4, the host can create fixed archive sub-folders 405, 505, 605 in user-created sub-folders 400, 500, 600 in the storage system 100. With this graphical user interface, the user has the option of designating data to be stored as archive (cold) data by dropping the data in the archive folder 305, 405, 505, 605 (either in the root folder 300 or in the user-created sub-folders 400, 500, 600). Similarly, the user has the option of designating data to be stored as temporary data (normal write) by dropping the data anywhere outside of the archive folder 305, 405, 505, 605. This provides an easy way to communication the user's preference.

In one embodiment, data put in an archive folder 305, 405, 505, 605 is flagged by the host, and the host passes on the flag to the storage system 100 as an indication that the data is archive data. (Alternatively, the storage system 100 can parse the file system to determine if the data has to be archived, but this may not be sufficient, as the file system may not be flushed to the host as often as the data writes itself.)

FIGS. 5-8 will now be described to illustrate how the storage system 100 can leverage this flag to optimize data storage. It should be noted that while a "flag" is used in this example, any suitable type of indicator (e.g., a data intent bit, a separate command, etc.) can be used. In general, the term "indicator" will be used herein to refer to any suitable type of indication that the storage system 100 can interpret as indicating the archive (or non-archive) nature of the data.

Figure 5:
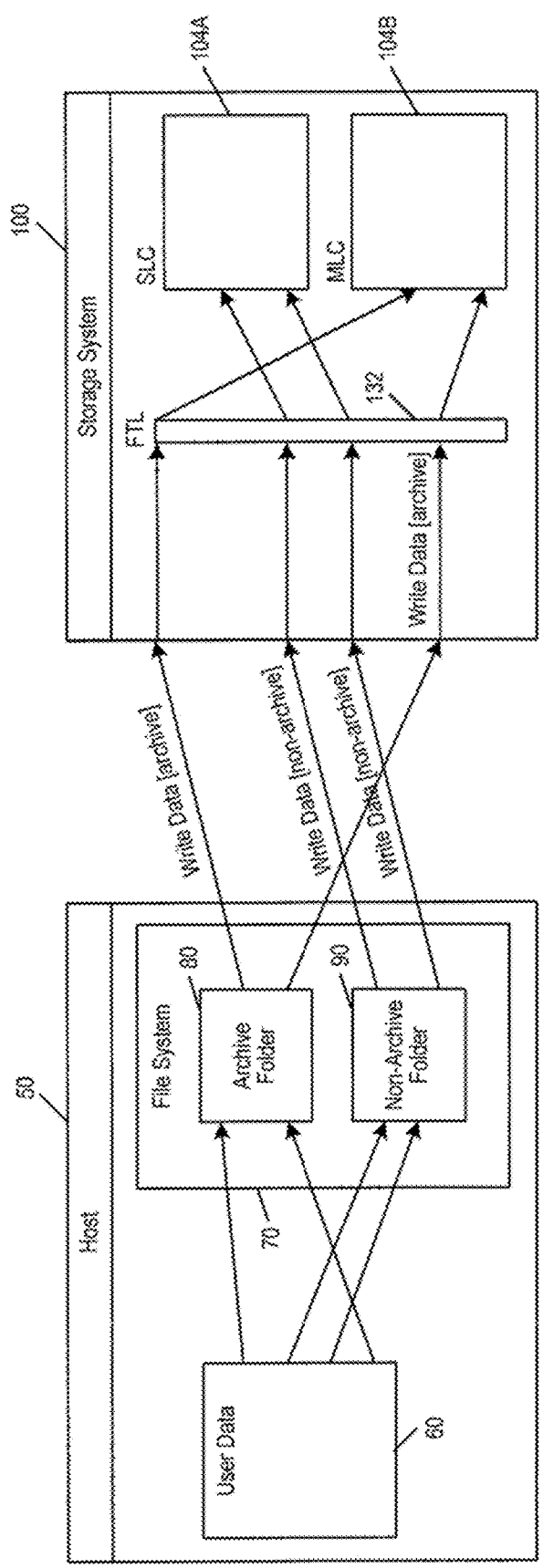
FIG. 5 is a block diagram of a host and storage system of an embodiment.
Figure 6:
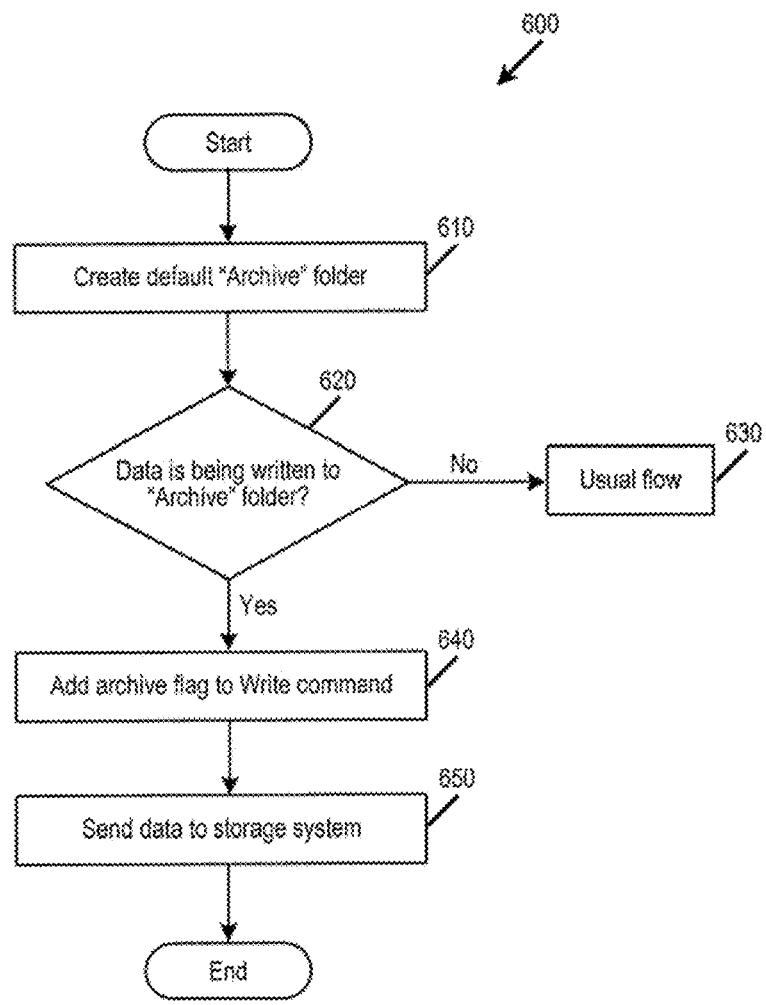
FIG. 6 is a flow chart of a method of an embodiment performed by a host for user-defined data archiving.

FIG. 5 is a block diagram of the host 50 and storage system 100 of this embodiment. As shown in the flow chart 600 of FIG. 6, the host 50 creates a default archive folder 80 in the file system 70 for the storage system 100 (act 610). The user then has the option of moving the user data 60 on the host to the archive folder 80 or to a non-archive folder 90. If the user moves the data 60 to a non-archive folder 90, the host 50 proceeds with its usual flow to write the data to the storage system 100 (act 620). However, if the user moves the data 60 to the archive folder 80, the host 50 adds an archive flag to the write command (act 640) and sends the data 60 to the storage system 100 (act 650). This is shown in FIG. 5 by "Write Data [archive]." As also shown in FIG. 5, non-archived data is sent to the storage system 100 without the flag.

Figure 7:
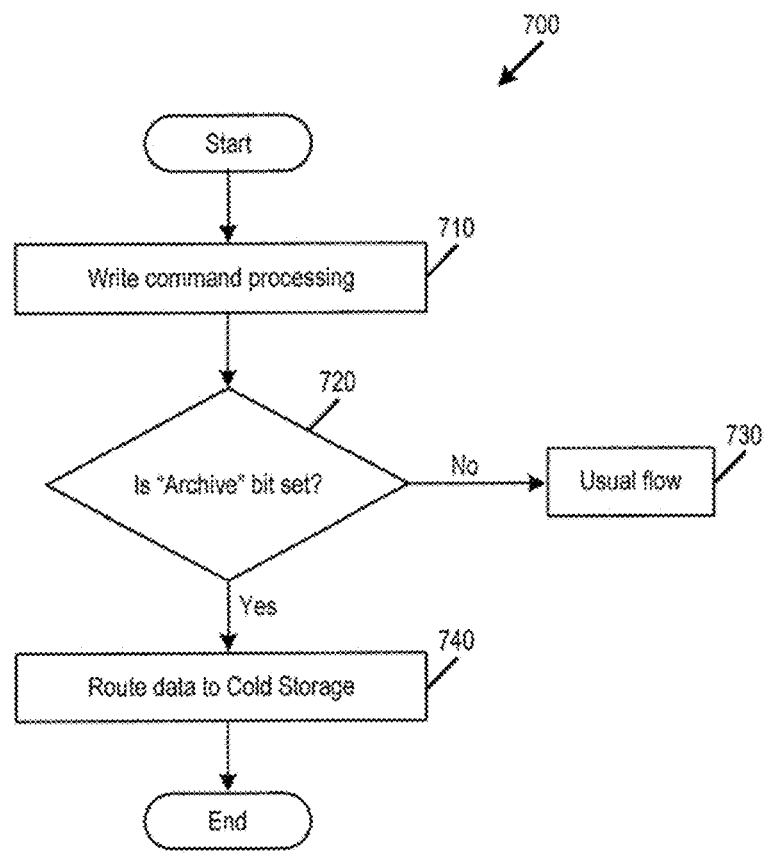
FIG. 7 is a flow chart of a method of an embodiment performed by a storage system during a write process for user-defined data archiving.

Turning now to the flow chart 700 in FIG. 7, when the storage system 100 receives a write command, it begins write command processing (act 710). FIG. 5 shows that the write command processing is performed by the FTL layer 132. However, write command processing can be performed by components (e.g., the user-defined data archiver 111) instead of or in addition to the FTL layer 132. More generally, the functionality can be performed by the controller 102 of the storage system 100. During command processing, the storage system 100 determines if the archive bit is set in the write command (act 720). If it is not, the storage system 100 processes the write command using the usual flow (e.g., first storing the data in SLC cells 104A and then moving the data to MLC cells 104B) (act 730). However, if the storage system 100 determines if the archive bit is set in the write command, the storage system 100 routes the data to cold storage (e.g., directly to the MLC cells 104B without storing the data first in SLC cells 104A)(act 740). This provides fewer relocation hassles for the data. Further, the data can be written to blocks of MLC cells 104B that have a high PEC count. Generally, incoming data is considered hot and written to blocks with a low PEC count. However, if the storage system 100 knows that the data is meant to be archived, the storage system 100 can directly write into the block with a high PEC count to reduce write amplification.

Figure 8:
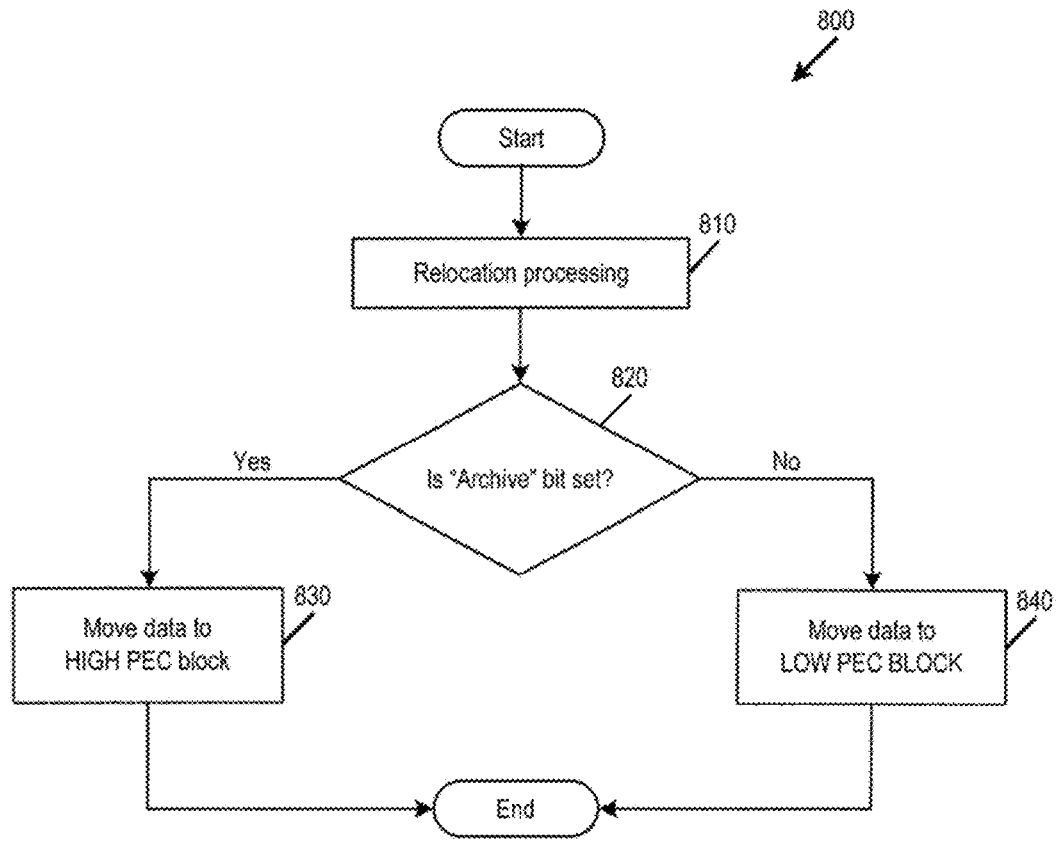
FIG. 8 is a flow chart of a method of an embodiment performed by a storage system during a relocation process.

As illustrated by the above example, the presence or absences of an archive flag can be used by the storage system 100 to route the data to different memory areas for initial storage. In another embodiment, the archive flag can also be used in garbage collection. In typical garbage collection operations, the hot or cold nature of data is identified only if the data is unmoved after some period of time. With these embodiments, the archive nature of data is known at the time of storage and can be leverage in the garbage collection process. For example, while moving the data from the source, the archive flag can be checked, and the archive data can be moved to a block with a high PEC since it is more likely to not get invalidated. This ensures the data stays in that block for a longer period of time and that the block will not be used in near future for writing. On the other hand, non-archive data can be moved to a block with a low PEC. Such a block is more likely to get invalidated and might be used again sooner for writing new data. The endurance of the storage is optimized with this approach and helps in wear leveling. This alternative is shown in the flow chart 800 of FIG. 8. As shown in FIG. 8, during relocation processing (act 810), the storage system 100 determines if the archive bit is set (act 820). If it is, the data is moved to a high PEC block (act 830); otherwise, the data is moved to a low PEC block (act 840).

In the above example, the user indicated that data should be archived by placing the data in a special folder using the functionality of the host (e.g., a display device and user interface) because, in that example, the storage system 100 did not have its own user interface that would allow the user to provide such a preference. Accordingly, the user interface software was provided at the host. Examples of such software include, but are not limited to, a smartphone app, a device driver, and a modification to the host's file system. In one embodiment, a device driver is automatically provided by the storage system to the host for installation when the storage system 100 is connected to the host. Functionalities provided by the driver can include, but are not limited to, a user interface (e.g., to create default archive folders in the file system), identification of archive data (e.g., to check whether a logical block address (LBA) range of a write command maps to that of an archive folder), and transferring archive information from the host to the storage system 100 (e.g., if the LBA maps to the archive folder, add the archive flag to the write command, such as by using existing NVMe context attributes defined in section 6.6.1 of the NVMe 1.1 specification or using new soft commands). Minor firmware changes may be required to store the archive attribute within metadata and to have routing and relocation based on archive flag information.

There are many alternatives that can be used with these embodiments. For example, while the above examples were illustrated using a folder, which is applicable to graphical user interface (GUI)-based operating systems, these embodiments can also be used in other operating systems (such as Linus) that do not provide the option of dropping a file into a folder. In such operating systems, the user can inform the host about the data type (e.g., archive status) using another mechanism, such as, but not limited to, an optional configuration of a command.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arranged in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method for user-defined data archiving, the method comprising:
   performing the following in a storage system comprising a memory, wherein the memory comprises single-level memory cells and multi-level memory cells:
   receiving a write command from a host;
   determining whether the storage system received an indicator from the host indicating that data of the write command is archive data;
   in response to determining that the storage system received the indicator, storing the data in the multi-level memory, cells;
   in response to determining that the storage system did not receive the indicator, storing the data in the single-level memory, cells;
   storing the indicator in the memory; and
   using the stored indicator to determine where to move the data in a garbage collection operation.

2. The method of claim 1, further comprising using the stored indicator to determine whether the data should be backed up to memory in a network cloud.

3. The method of claim 1, further comprising in response to determining that the storage system received the indicator, storing the data in a block of multi-level memory cells that has a first program error count (PEC) without first storing it in another block of multi-level memory cells that has a program error count (PEC) lower than the first program error count (PEC).

4. The method of claim 1, further comprising providing the host with computer-readable program code configured to allow a user to place the data in an archive folder to indicate that the data is archive data.

5. The method of claim 4, wherein the archive folder is in a root folder of the storage system.

6. The method of claim 4, wherein the archive folder is in a user-created sub-folder of the storage system.

7. The method of claim 1, wherein the memory comprises a three-dimensional memory.

8. The method of claim 1, wherein the storage system is configured to be integrated in the host.

9. The method of claim 1, wherein the storage system is configured to be removably connected with the host.

10. A storage system comprising:
    a memory; and
    a controller configured to be in communication with the memory, wherein the controller is further configured to:
    receive a write command from a host;
    determine whether an archive attribute is present in the write command, wherein the archive attribute indicates that data of the write command was placed by a user into an archive folder in the host; and
    route the data to different locations in the memory depending on whether or not the archive attribute is present in the write command;
    wherein the archive folder is in a root folder of the storage system or is a user-created sub-folder of the storage system.

11. The storage system of claim 10, wherein the controller is further configured to route the data to multi-level memory cells in the memory in response to the archive attribute being present in the write command.

12. The storage system of claim 10, wherein the controller is further configured to store the archive attribute in the memory.

13. The storage system of claim 12, wherein the controller is further configured to use the stored archive attribute in a garbage collection operation.

14. The storage system of claim 13, wherein the controller is further configured to store the data in a block of memory cells that has a first program error count (PEC) without first storing it in another block of memory cells that has a program error count (PEC) lower than the first program error count (PEC).

15. The storage system of claim 10, wherein the controller is further configured to provide the host with computer-readable program code configured to allow a user to place the data in the archive folder.

16. The storage system of claim 10, wherein the memory comprises a three-dimensional memory.

17. The storage system of claim 10, wherein the storage system is configured to be integrated in the host.

18. The storage system of claim 10, wherein the storage system is configured to be removably connected with the host.

19. The storage system of claim 10, wherein cold storage in the memory comprises multi-level memory cells.

20. A storage system comprising:

a memory;

means for determining whether the storage system received information from a host that indicates that data was placed by a user into an archive folder in the host, wherein the archive folder is in a root folder of the storage system or is a user-created sub-folder of the storage system;

and means for using the information to determine whether the data should lie backed up to memory in a network cloud.

* * * * *